(12) United States Patent
Franzi

(10) Patent No.: US 11,953,861 B2
(45) Date of Patent: Apr. 9, 2024

(54) METHOD FOR MANAGING THE USE OF THE FUNCTIONS OF A WATCH

(71) Applicant: Tissot SA, Le Locle (CH)

(72) Inventor: Edoardo Franzi, Cheseaux-Noreaz (CH)

(73) Assignee: Tissot SA, Le Locle (CH)

( * ) Notice: Subject to any disclaimer, the term of this patent is extended or adjusted under 35 U.S.C. 154(b) by 165 days.

(21) Appl. No.: 17/097,576

(22) Filed: Nov. 13, 2020

(65) Prior Publication Data

US 2021/0173352 A1    Jun. 10, 2021

(30) Foreign Application Priority Data

Dec. 6, 2019  (EP) ..................................... 19214105

(51) Int. Cl.
*G06F 21/00*  (2013.01)
*G04G 21/02*  (2010.01)
*G06F 21/32*  (2013.01)

(52) U.S. Cl.
CPC ........... *G04G 21/025* (2013.01); *G06F 21/32* (2013.01); *G06F 2221/2139* (2013.01)

(58) Field of Classification Search
CPC .... G04G 21/025; G04G 9/0064; G06F 21/32; G06F 2221/2139; G06F 21/629; G06F 21/31

See application file for complete search history.

(56) References Cited

U.S. PATENT DOCUMENTS 6,720,860 B1 * 4/2004 Narayanaswami ..... G06F 21/36
340/5.55
10,075,846 B1 * 9/2018 Acar ................... H04L 63/0861
(Continued)

FOREIGN PATENT DOCUMENTS

JP    10-289210 A    10/1998
JP    2011-253340 A  12/2011
(Continued)

OTHER PUBLICATIONS

Japanese Office Action dated Nov. 24, 2021 in Japanese Patent Application No. 2020-193068 (with English translation), citing documents AO through AR therein, 7 pages.
(Continued)

*Primary Examiner* — Jeffrey C Pwu
*Assistant Examiner* — William A Corum, Jr.
(74) *Attorney, Agent, or Firm* — Oblon, McClelland, Maier & Neustadt, L.L.P.

(57) ABSTRACT

A method for managing the use of the functions of a watch including a step of authenticating the wearer of the watch in order to authorize access to the functions, and a step of controlling the identity of the wearer of the watch at a determined period by verifying the validity of a digital identification element determined from at least one biometric information element of the wearer, and a step of unlocking access to the functions of the watch when this access has been locked, the step including the following sub steps: presentation of a graphic representation on an interface for broadcasting a visual piece of information of the watch; selection within a limited time interval of a sequence of at least two identification portions comprised in the graphic representation aiming at identifying the wearer, the sequence corresponding to an identification code of the wearer, and validation of the selected sequence.

16 Claims, 1 Drawing Sheet

(56) References Cited

U.S. PATENT DOCUMENTS

| | | | |
|---|---|---|---|
| 11,237,525 B2* | 2/2022 | Pi | A61B 5/0205 |
| 2009/0328163 A1* | 12/2009 | Preece | H04L 63/10 |
| | | | 726/5 |
| 2014/0282973 A1* | 9/2014 | Langley | G06F 21/36 |
| | | | 726/7 |
| 2015/0242605 A1* | 8/2015 | Du | H04W 12/065 |
| | | | 726/7 |
| 2016/0109861 A1* | 4/2016 | Kim | G04G 9/00 |
| | | | 368/69 |
| 2017/0017785 A1* | 1/2017 | Rice | H04N 5/23232 |
| 2019/0080153 A1* | 3/2019 | Kalscheur | G06V 40/166 |
| 2020/0117789 A1* | 4/2020 | Funk | G06F 21/316 |
| 2020/0146625 A1 | 5/2020 | Nousiainen et al. | |
| 2020/0192568 A1* | 6/2020 | Goertz | G06F 3/04855 |
| 2020/0201977 A1* | 6/2020 | Le Cardinal | H04W 12/068 |

FOREIGN PATENT DOCUMENTS

| | | |
|---|---|---|
| JP | 2017-27594 A | 2/2017 |
| JP | 2017-515178 A | 6/2017 |
| KR | 2017/0001219 A | 1/2017 |
| WO | WO 2018/202952 A1 | 11/2018 |

OTHER PUBLICATIONS

European Search Report dated Jun. 16, 2020 in European Application 19214105.9 filed Dec. 6, 2019 (with English Translation of Categories of Cited Documents & Written Opinion), citing documents AA-AC and AO-AP therein, 8 pages.

\* cited by examiner

METHOD FOR MANAGING THE USE OF THE FUNCTIONS OF A WATCH

CROSS-REFERENCE TO RELATED APPLICATION

This application claims priority to European Patent Application No. 19214105.9 filed on Dec. 6, 2019, the entire disclosure of which is hereby incorporated herein by reference.

TECHNICAL FIELD

The present invention relates to a method for managing the use of the functions of a watch and to a system implementing such a method.

The invention also relates to a watch comprising such a system as well as a computer program.

PRIOR ART

A watch comprises set of functions that can be used by the wearer. In addition to setting the time or date, such functions may involve the use of confidential or private data specific to the wearer and useful for accessing personalised services. These data are, for example, keys, certificates, authentication codes, passwords and personal codes which allow a secure connection of the watch to be made to a private company network, an authentication with secure servers such as a bank server, or secure messaging for sending and receiving signed and/or encrypted emails. Therefore, it is then understood that it is important to be able to secure access to the use of the functions of such a watch.

For this purpose, methods are known in the state of the art which provide for managing the use of the functions of a watch by reinforcing the authentication criteria authorising/prohibiting this use, for example by implementing additional authentication steps.

However, one of the major disadvantages of such methods is related to the fact that once the wearer of the watch is authenticated, it is then possible for any individual to have access to the functions of the watch, in particular in the case where the latter was stolen.

It is understood that there is a need to find an alternative solution, in particular which does not have the disadvantages of the prior art.

SUMMARY OF THE INVENTION

A purpose of the present invention is consequently to provide a method for managing the use of the functions of a watch which is reliable and robust.

Such a method has the advantage of ensuring the identity of the wearer of the watch in an automatic, transparent and non-intrusive manner for the wearer.

For this purpose, the invention relates to method for managing the use of the functions of a watch including:
- a step of authenticating the wearer of the watch in order to authorise access to said functions, and
- a step of controlling the identity of the wearer of the watch at a determined period by verifying the validity of a digital identification element determined from at least one biometric information element of the wearer of said watch in order to maintain access to said functions, and
- a step of unlocking access to said functions of the watch when this access has been locked following a verification of the digital identification element showing its invalidity,
- presentation of a graphic representation on an interface for broadcasting a visual piece of information of said watch;
- selection within a limited time interval of a sequence of at least two identification portions comprised in said graphic representation aiming at identifying said wearer, said sequence corresponding to an identification code of the wearer, and
- validation of the selected sequence.

In other embodiments:
- the selection sub-step comprises a phase of visualising at least one of said identification portions of the sequence in said graphic representation;
- the visualisation phase comprises a sub-phase of preselecting at least one area of interest from the graphic representation capable of comprising said at least one identification portion;
- the validation sub-step comprises a phase of comparison between said selected sequence and a reference sequence;
- said at least one biometric information element is comprised in a portion of the wearers skin;
- the control step comprises a sub-step of acquiring by at least one multispectral biometric skin sensor comprised in the watch, a plurality of images of a portion of the wearers skin adjacent to said sensor, said images comprising said at least one biometric information element comprised in this skin portion;
- the control step comprises a sub-step of generating a digital identification element from said at least one biometric information element;
- the control step comprises a sub-step of validating a digital identification element generated in anticipation of the control of the identity of the wearer;
- the validation sub-step comprises a comparison phase including a sub-phase of maintaining the authorisation to access said functions of the watch if the generated digital identification element is substantially similar or similar to a reference digital identification element;
- the acquisition sub-step comprises a phase of illuminating the skin portion according to different wavelengths;
- the acquisition sub-step comprises a phase of capturing images of the skin portion illuminated at different wavelengths;
- the generation sub-step comprises a phase of characterising said at least one biometric information element comprised in the acquired images relating to said skin portion;
- the generation sub-step comprises a phase of designing the digital identification element from the characterisation of said biometric information element;
- the biometric information element relates to a vascular network or to a texture of this skin.

The invention also relates to a system for managing the use of the functions of a watch implementing this method, the system comprising the following elements connected together: a processing unit, a biometric sensor, an input interface and an interface for broadcasting a visual piece of information.

Advantageously, the biometric sensor is a multispectral biometric skin sensor.

The invention also relates to a watch, in particular a connected mechanical watch, including such a system.

The invention also relates to a computer program comprising program code instructions for executing the steps of this method when said program is executed by a processing unit.

BRIEF DESCRIPTION OF THE FIGURES

Other particularities and advantages will emerge clearly from the description which is given below, in an indicative and non-limiting manner, with reference to the appended figures, wherein.

DETAILED DESCRIPTION OF THE INVENTION

Figure 1:
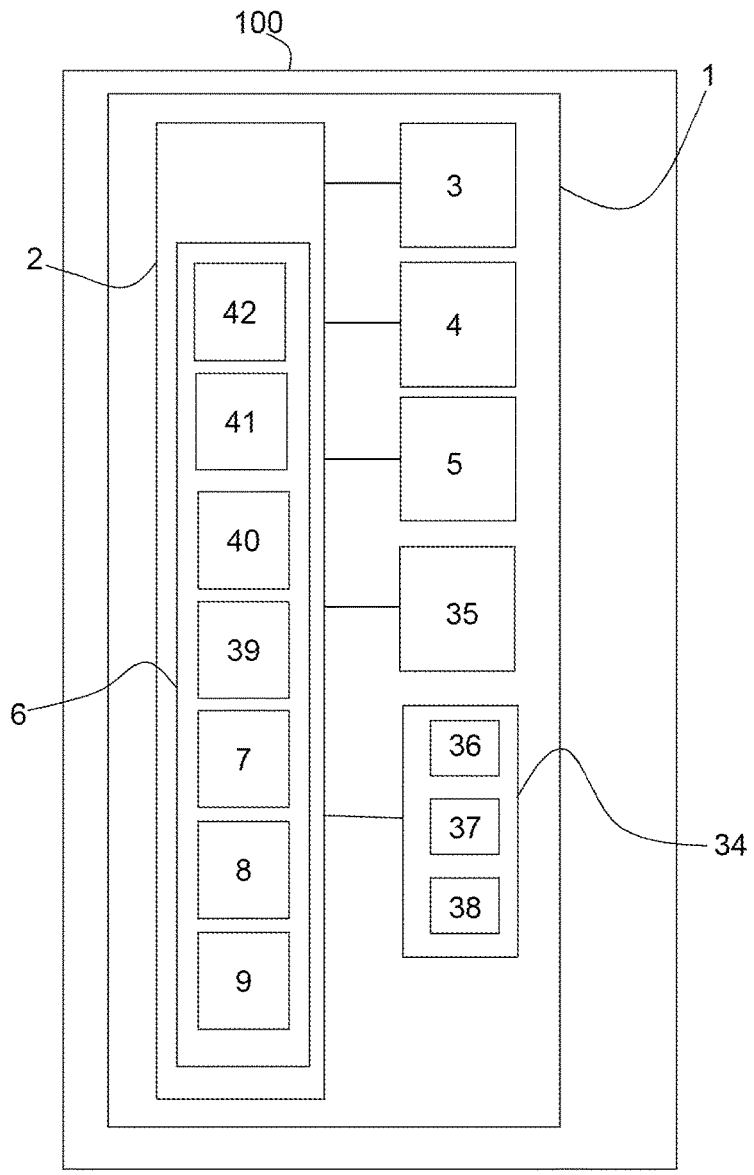
FIG. 1 is a schematic representation of a watch comprising a system for managing the use of the functions of a watch, according to one embodiment of the invention

FIG. 1 shows a watch 100 comprising a system for managing the use of the functions of this watch 100. Such a system 1 is comprised in the watch 100 which is preferably a mechanical watch 100 connected to a hybrid display. In this context, this electronic device 100 comprises a body such as the watch case, and an attachment element such as a wristlet allowing to fasten this body, for example to the wrist of the wearer. This system 1 more specifically comprises in a non-limiting and/or non-exhaustive manner:
- a processing unit 2 including hardware and software resources, in particular at least one processor cooperating with memory elements 6;
- an interface for broadcasting a visual piece of information 3 such as a hybrid display dial provided with a first analogue display component and a second digital and/or alphanumeric display component;
- an interface for broadcasting an audio piece of information 4 such as a loudspeaker;
- a wireless communication interface 5 (for example cellular, WLAN Bluetooth, etc.);
- an input interface 35 such as a keyboard or a touch interface comprised for example in the interface for broadcasting a visual piece of information 3, and
- a biometric sensor (34) in particular a multispectral biometric skin sensor 34 in this embodiment, such a sensor 34 comprising at least one photographic sensor 36, at least one multispectral illumination source 37 and at least one thermal image sensor 36, the illumination source 37 being able to emit light radiation in wavelengths comprised between 300 and 1100 nm, in addition this illumination source 37 can be of the laser type.

In this system 1, the processing unit 2 is connected, among others, to the interlaces for broadcasting a visual and sound piece of information 3, 4, to the input interface 35 as well as to the wireless communication interlace 5 and to the multispectral biometric sensor 34. It will also be noted that the multispectral biometric sensor 34 is arranged in the body of the electronic device 100 and/or in the attachment element.

This system 1 implemented in the electronic device 100 is capable of ensuring the identity control of the authenticated wearer of the watch in a discreet manner, that is to say without direct intervention/interaction of the wearer with this watch 100, so that he can use the functions of the watch 100 all the time he is wearing it, without having to authenticate himself again. The identification of the wearer is then carried out in a transparent and discreet manner, from at least one biometric information element comprised in the skin of this wearer such as the vascular network of the skin or the texture of this skin. This skin of the wearer which covers his body has a particularity, less obvious to be considered by the person skilled in the art because not naturally visible to the human eye, related to the features of absorption and reflection at different wavelengths (spectrum) of the components of the skin, located at different depths. In a simplified model, the skin consists of a layer called "epidermis"; which is semi-transparent and located on the surface then, under the epidermis, of a layer called "dermis" and comprising, among others, the blood vessels (or vascular network) wherein the haemoglobin is highly reflective at high wavelengths close to red, being for example comprised between 760 and 930 nm, which allows here to reveal or show the vascular network of the wearers skin, in other words, the light absorption spectrum of the components of the epidermis and the dermis constituting the skin not being uniform according to the electromagnetic wavelengths, the appearance and the colour of the skin result from a complex combination of these phenomena. Thus, when it comes to showing or revealing a biometric information element such as the texture of the skin of this wearer, a texture essentially formed of cracks or cavities, the illumination of the skin can then be ensured by an illumination source restricted to wavelengths around red which tends to make the shadow phenomenon disappear from the bottom of the cracks. Indeed, there is a retro projection effect by reflection on the dermis and through the epidermis of these wavelengths close to red, while the illumination of the skin by a source of colour spectrum far from red, typically the wavelength band located between violet (400 nm) and up to yellow-orange (600 nm), on the contrary allows to strongly contrast these cracks in the skin by the appearance of shadows at the bottom of these cracks. It should be noted that the identification of a biometric information element comprised in the skin can be improved by the use of the thermal image sensor 38, preferably without illumination. By way of example, for showing the texture of the skin, in particular when the concerned portion of the skin of this wearer is provided with hair, the use of the thermal image sensor 38, preferably without illumination. By way of example, for showing the texture of the skin, in particular when the concerned portion of the skin of this wearer is provided with hair, the use of the thermal image sensor 38 allows to reveal the cracks of this texture of the skin which are generally warmer than the surrounding skin and the hair colder than the surrounding skin. Thus, in this configuration, the hair can be thermally distinguished from cracks in the texture of the skin due to this difference between their respective temperatures.

It should be noted that the thermal image capture can be carried out under illumination in a given wavelength depending on the biometric information element that should be shown or revealed.

It is therefore understood, according to the principle of the invention, that the periodic identification of the wearer is carried out on the basis of at least one biometric information element comprised in images of a portion of the skin of this wearer which can be illuminated, where appropriate, according to different wavelengths in order to capture images comprising the desired biometric information element, Thus, this biometric information element, comprised in these images, can be shown by the illumination performed in different wavelengths or without illumination, for example when it comes to capturing thermal images.

In this system 1, the memory elements 6 of the processing unit 2 comprise data relating to a reference digital identification element previously defined/generated. These memory elements 6 also include digital image processing algorithms 39 allowing to characterise at least one biometric information element relating to the wearer's skin and which is comprised in the images relating to the portion of the wearer's skin. These memory elements 6 also include algorithms 40 for generating the reference digital identification element but also the digital identification element which is generated periodically as part of the control of the identity of the wearer.

These memory elements 6 of the processing unit 2 also comprise at least one graphic representation 41 provided to participate in the unlocking of an access to the functions of the watch 100. This graphic representation 41 can for example be an image comprising at least one object. By way of example, this image defines a scene comprising a plurality of objects such as houses, vehicles and/or a star such as the moon, etc. It is obviously understood that this image can define other types of scenes including at least one object. These memory elements 6 also include data relating to a reference sequence 42 comprising reference identification portions of this graphic representation 41, said portions having been previously selected by the wearer of the watch during the configuration of a process for unlocking access to the functions of the watch 100.

Figure 2:
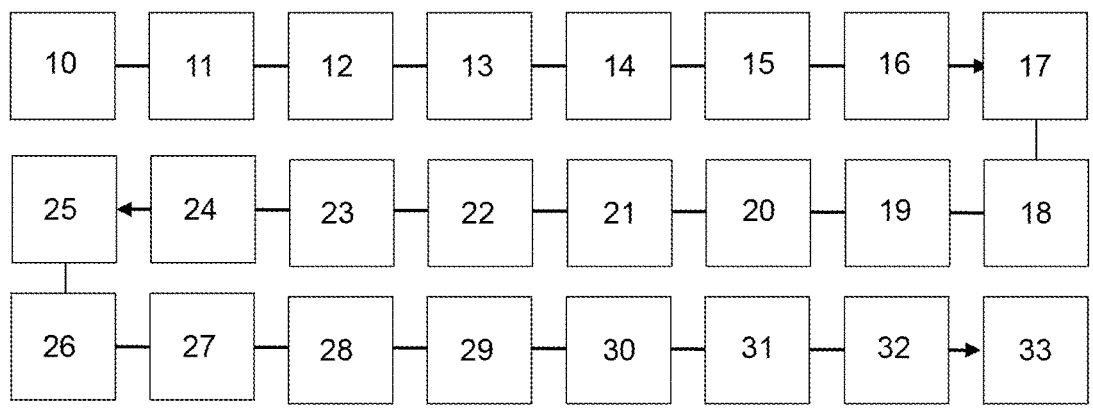
FIG. 2 is a flowchart relating to a method of managing the use of the functions of the watch, according to the embodiment of the invention.

Such a system 1 of the watch 100 is capable of implementing a method for securing access to the use of the functions of the watch 100, shown in FIG. 2. Such a method aims at ensuring in a discreet manner that is to say in a non-intrusive and automatic manner of the identity of an authenticated wearer so that he can use the functions of the watch 100 all the time he is wearing it without having to authenticate himself again. The functions of the watch 100 can relate to the setting of the time, the date or else the use of a stopwatch, a navigation system, a pedometer, an activity tracker, a messaging system, an access to confidential or private data specific to the wearer and useful for accessing personalised services, etc.

This method comprises a step 10 of authenticating the wearer of the watch 100 in order to authorise access to said functions of this watch 100, This step 10 allows the wearer to provide proof of his identity. Indeed, the wearer can interact with the input interface 35 for authentication using an authenticator or a secret code.

This method then comprises a step 12 of discretely controlling at a determined period the identity of the wearer of the watch by verifying the validity of a digital identification element determined from at least one biometric information element comprised in a skin portion of the wearer of said watch in order to maintain/remove the authorisation to access these functions. During this step 12, the determined period is a regular or irregular control period which can be configured automatically by the processing unit 2 or defined by the wearer. For example, this period can be a few seconds or a few minutes. Such a control step 12 allows to verify at the end of each period that the wearer of the watch is still the same by controlling his "biometric" identity from a digital identification element established depending on at least one biometric information element comprised in the skin of this wearer.

This control step 12 then comprises a sub-step 13 of acquiring, by the sensor 34, a plurality of images of a portion of the wearer's skin, said skin being arranged in an adjacent manner to said sensor, said images comprising said at least one biometric information element comprised in this skin portion. This sub-step 13 comprises a phase of illuminating 14 the skin portion according to different wavelengths, More specifically, during this phase 14, the processing unit 2 drives the multispectral biometric sensor 34 and in particular the illumination source 37 so that the latter emits light radiation in the direction of the skin portion according to a precise wavelength adapted for showing or revealing said at least one biometric information element specific to the skin, which is here sought as part of the control of the identity of the wearer, and which is comprised in this portion of the wearer's skin. Once the illumination has been configured, the acquisition sub-step 13 comprises a phase 15 of capturing images of this skin portion illuminated at least at one wavelength capable of showing or revealing said at least one biometric information element. During this phase 15, the processing unit 2 drives the multispectral biometric skin sensor 34 and in particular the photographic sensor 36 synchronously with the activation/deactivation of the illumination source 37, in order to capture at least one image relating to the skin portion illuminated for at least one wavelength.

This acquisition sub-step 13 can also comprise a phase 16 of capturing at least one thermal image of the skin portion. Such a phase 16 is preferably carried out without illumination but in other alternatives illuminating the portion can be carried out at least at one given wavelength, this is obviously depending on the biometric information element that should be shown or revealed. This phase 16 can be carried out before or after the illumination 14 and image capture 15 phases.

The control step 12 then comprises a sub-step 17 of generating the digital identification element from said at least one biometric information element comprised in the acquired images of the skin portion. Such a sub-step 17 comprises a phase 18 of characterising said biometric information element comprised in the images relating to said skin portion. During this phase 18, the processing unit 2 implements algorithms 39 for processing acquired images aiming at identifying/detecting in each of them said at least one biometric information element that they comprise. As already mentioned previously, it may be information elements relating, for example, to the texture of the skin or to the vascular network comprised in this portion of the wearer's skin. The implementation of these algorithms 39, 40 by the processing unit 2 can, by way of example, provide for a process of cutting these images into segments. It is understood here that each acquired image gives an overall view of the portion of the wearer's skin, and then includes areas of varying relevance for the identification of said at least one biometric information element. Such a cutting process participates in extracting the segments to be processed and in eliminating the parts not to be processed in these images. These algorithms 39 can then provide an indexing of these image segments comprising features relating to said at least one particular biometric information element to be identified, by localisation areas in the skin portion, in order to be able to assign to each area the adequate processing regarding the morphological typology of the feature of this geographical area of the portion. In this context, these algorithms 39 process each segment of these images by showing the pieces of information carried by the pixels of each of these images by performing image analysis operations of the processing, transformation and detection type. Subsequently, these algorithms 39 perform feature filtering and extraction or vectorisation operations, in order to convert the image data relating to said at least one identified and extracted biometric information element, into parametric data, typically relative numerical values expressed for example as an index or as a percentage.

It is understood here that the acquisition of several images representing the same skin, helps to improve the precision and efficiency of this characterisation phase 18.

Subsequently, the generation sub-step 16 comprises a phase 19 of designing the digital identification element from the characterisation of said at least one biometric information element. During this phase 19, the processing unit 2 implements algorithms for generating 40 such a digital identification element specifically provided for the processing of the parametric data obtained during the characterisation phase 13, which parametric data being relating to the biometric information element.

Then, the control step 12 comprises a sub-step 20 of validating the digital identification element generated in anticipation of a control of the identity of the wearer. This validation sub-step 20 comprises a comparison phase 21, implemented by the processing unit 2, between the generated digital identification element and the reference digital identification element. In this method, the reference digital identification element can be created, once the wearer has been duly authenticated and his identity is certain, during a step 11 of defining this reference digital identification element providing sub-steps similar to the acquisition 13 and generation 17 sub-steps implemented during the control step 12. In this method, once the wearer of the watch 100 is authenticated, the processing unit 2 implements this definition step 11 and then performs an archiving of the obtained reference digital identification element in the memory elements 6 of the processing unit 2, This reference digital identification element can therefore be determined automatically by the processing unit 2 or configured by the wearer during an adjustment process aiming at guiding the wearer in defining this reference digital identification element.

The comparison phase 21 also comprises a sub-phase 22 of maintaining the authorisation to access the functions of the watch 100 if the digital identification element generated is substantially similar or similar to the reference digital identification element. In this case, the control unit 2 executes again, according to the determined period, the acquisition 13 and generation 17 sub-steps of the control step 12 in order to carry out the comparison phase 21 again.

Conversely, this comparison phase 21 comprises a sub-phase 23 of removing the authorisation to access said functions of the watch 100 if the digital identification element generated is substantially different or different from the reference digital identification element. In this case, access to the functions of the watch 100 is then removed because the wearer and owner of watch 100 may no longer be in their possession. Therefore in this context, this sub-phase 23 then provides for locking access to the functions of this watch. Thus, in order to use the functions of the watch 100 again, it is necessary to unlock this access.

For this purpose, the method comprises a step 24 of unlocking the access to the functions of the watch 100 when this access has been locked after a verification of the digital identification element showing its invalidity.

This step 24 comprises a sub-step 25 of presenting a graphic representation 41 on the interface for broadcasting a visual piece of information 3 of said watch 100. This sub-step 25 includes a phase 26 of generating the display, on/in the interface for broadcasting a visual piece of information 3, of the graphic representation 41 provided for implementing this unlocking of access to the functions of the watch 100. This phase 26 may comprise a sub-phase of selecting by the wearer from a sample of at least two graphic representations displayed on the interface 3 for broadcasting a visual piece of information, the graphic representation 41 provided for the implementation of this unlocking. It will be noted that the wearer is the only one who knows the graphic representation 41 that he has chosen when configuring the process for unlocking access to the functions of the watch 100.

This presentation sub-step 25 then comprises a phase 27 of triggering a countdown as soon as the generation phase 26 is carried out. In other words, the preconfigurable countdown is triggered once the graphic representation 41 is presented on the broadcast interface 3. Such a phase 27 participates from a limited time interval defined by this countdown, in counting the estimated time required for the input of the sequence of identification portions of the graphic representation 41 displayed on/in the broadcast interface 3.

Subsequently, the unlocking step 24 comprises a sub-step 28 of selecting within the limited time interval a sequence of at least two identification portions of said graphic representation 41 aiming at identifying said wearer, said sequence corresponding to an identification code of the wearer. Such identification portions are not directly visible in the graphic representation 41 presented on/in the broadcasting interface 3. Under these conditions, the selection sub-step 28 comprises a phase 29 of visualising at least one of said identification portions of the sequence in said graphic representation 41. This visualisation phase 29 comprises a sub-phase of selecting at least one area of interest of the graphic representation 41 capable of comprising said at least one identification portion, During this sub-phase, the wearer selects for example a first area of interest or a second area of interest by carrying out an enlargement of this first area or this second area from the input interface 35. Once this first or second area of interest is selected, the identification portions then become visible. In this configuration, each identification portion useful for the performing/constituting the sequence can be selected from the input interface 35.

It should be noted that the sequence comprises an ordered number of identification portions and that the selected area of interest may comprise, for example, three identification portions only two of which are ordered successively one after the other in the sequence. In this context, the remaining identification portion requires in order to be part of the sequence, the selection of an identification portion comprised in another area of interest of the graphic representation 41.

Then, the unlocking step 24 comprises a sub-step 30 of validating the selected sequence. This validation sub-step 30 comprises a phase 31 of controlling that the selection of the sequence of identification portions has been carried out within the limited time interval defined by the countdown. Insofar as this selection has been made within this limited time interval, the validation sub-step 30 then comprises a comparison phase 32, implemented by the processing unit 2, between said selected sequence and the reference sequence 42. This comparison phase 32 comprises a sub-phase of prohibiting access to the functions of the watch 100 if said sequence is substantially different or different from the reference sequence 42. Conversely, this comparison phase 32 comprises a sub-phase of authorising access to the functions of the watch 100 if said sequence is substantially similar or similar to the reference sequence 42.

Insofar as this selection was not carried out within the limited time interval, the validation sub-step 30 comprises a phase 33 of renewing the presentation 25 and selection 28 sub-steps. If subsequently, the selection of the sequence has not been carried out again within the limited time interval, the validation sub-step 30 then provides for a sub-step of blocking the functions of the watch 100 during a given time or else definitively.

The invention also relates to a computer program comprising program code instructions for the execution of steps 10 to 33 of this method when said program is executed by the processing unit 2 of the watch 100.

The invention claimed is:

1. A method for managing the use of the functions of a watch comprising:
a step of authenticating the wearer of the watch in order to authorize access to said functions, and
a step of controlling the identity of the wearer of the watch at a determined period by verifying the validity of a digital identification element determined from at least one biometric information element of the wearer of said watch in order to maintain access to said functions, and
a step of unlocking access to said functions of the watch when said access has been locked following a verification of the digital identification element showing its invalidity, said step of unlocking comprising the following sub-steps:
presentation of a graphic representation on an interface for broadcasting a visual piece of information of said watch;
selection within a limited time interval of a sequence of at least two identification portions comprised in said graphic representation aiming at identifying said wearer, said sequence corresponding to an identification code of the wearer, said limited time interval being defined by a countdown that begins as soon as the graphic representation is presented on the interface, and
validation of the selected sequence,
wherein the selection sub-step includes visualizing the at least two identification portions as the identifications portions are not visible in the graphic representation on the interface for broadcasting of the watch, the at least two identification portions being made visible by the user enlarging a first area of interest, the first area of interest being a visible portion of the graphic representation prior to the enlarging, in order for the at least two identification portions to be visible within the first area of interest after the enlarging and then the user must select the at least two identification portions in said sequence corresponding to an identification code of the wearer after the at least two identification portions are made visible.

2. The method according to claim 1, wherein the validation sub-step comprises a phase of comparison between said selected sequence and a reference sequence.

3. The method according to claim 1, wherein said at least one biometric information element is comprised in a portion of the wearer's skin.

4. The method according to claim 1, wherein the control step comprises a sub-step of acquiring by at least one multispectral biometric skin sensor comprised in the watch, a plurality of images of a portion of the wearer's skin adjacent to said sensor, said images comprising said at least one biometric information element comprised in said skin portion.

5. The method according to claim 1, wherein the control step comprises a sub-step of generating a digital identification element from said at least one biometric information element.

6. The method according to claim 1, wherein the control step comprises a sub-step of validating a digital identification element generated in anticipation of the control of the identity of the wearer.

7. The method according to claim 6, wherein the validation sub-step comprises a comparison phase including a sub-phase of maintaining the authorization to access said functions of the watch if the generated digital identification element is substantially similar or similar to a reference digital identification element.

8. The method according to claim 4, wherein the acquisition sub-step comprises a phase of illuminating the skin portion according to different wavelengths.

9. The method according to claim 4, wherein the acquisition sub-step comprises a phase of capturing images of the skin portion illuminated at different wavelengths.

10. The method according to claim 5, wherein the generation sub-step comprises a phase wherein at least one biometric information element comprised in the acquired images relating to said skin portion.

11. The method according to claim 5, wherein the generation sub-step comprises a phase of designing the digital identification element from the characterization of said biometric information element.

12. The method according to claim 1, wherein the biometric information element relates to a vascular network or to a texture of said skin.

13. A system for managing the functions of a watch, the system comprising the following elements connected together: a processing unit, a biometric sensor, an input interface and an interface for broadcasting a visual piece of information, the elements being configured to implement the method according to claim 1.

14. The system according to claim 13, wherein the biometric sensor is a multispectral biometric skin sensor.

15. A watch, in particular a connected mechanical watch, including a system according to claim 13.

16. The method according to claim 1, wherein the sequence corresponding to the identification code of the wearer includes selecting an additional identification portion after the at least two identification portions, the additional identification portion being located in a second area of interest that is different than the first area of interest that includes the at least two identification portions.

* * * * *